(12) United States Patent
Danielson et al.

(10) Patent No.: US 8,340,984 B2
(45) Date of Patent: Dec. 25, 2012

(54) CERTIFIED IT SERVICES IN-A-BOX

(75) Inventors: Debra Jean Danielson, Somerset, NJ (US); Eitan Hadar, Nesher (IL)

(73) Assignee: Computer Associates Think, Inc., Islandia, NY (US)

( * ) Notice: Subject to any disclaimer, the term of this patent is extended or adjusted under 35 U.S.C. 154(b) by 192 days.

(21) Appl. No.: 12/767,431

(22) Filed: Apr. 26, 2010

(65) Prior Publication Data

US 2011/0264471 A1 Oct. 27, 2011

(51) Int. Cl.
 G06Q 40/00 (2006.01)
 G06Q 10/00 (2006.01)
 G06Q 30/00 (2006.01)
 G06Q 90/00 (2006.01)

(52) U.S. Cl. ............. 705/4; 705/1.1; 705/307; 705/347; 705/500

(58) Field of Classification Search .................. 705/1.1, 705/307, 347, 500
 See application file for complete search history.

(56) References Cited

U.S. PATENT DOCUMENTS

| 2006/0031247 | A1* | 2/2006 | Shah .............................. 707/102 |
| 2009/0210427 | A1* | 8/2009 | Eidler et al. .................... 707/10 |
| 2010/0332262 | A1* | 12/2010 | Horvitz et al. ................... 705/4 |
| 2011/0078074 | A1* | 3/2011 | Lipman .......................... 705/39 |

FOREIGN PATENT DOCUMENTS

DE 102009040361 * 4/2010

OTHER PUBLICATIONS

Market-Oriented Cloud Computing: Vision, Hype, and Reality for Delivering IT Services as Computing Utilities Rajkumar Buyya ,2, Chee Shin Yeol , and Srikumar Venugopall Sep. 2008.*
Service and Utility Oriented Distributed Computing Systems: Challenges and Opportunities for Modeling and Simulation Communities. Rajkumar Buyya and Anthony Sulistio 2008 IEEE.*

* cited by examiner

*Primary Examiner* — William Rankins
(74) *Attorney, Agent, or Firm* — Schwegman Lundberg & Woessner, P.A.

(57) ABSTRACT

A system, in a cloud computing environment ("CCE") includes a data processor. One or more cloud computing auditing components are configured to monitor the CCE in accordance with a predefined insurance level agreement ("ILA") and to create a log of one or more CCE events indicated by the ILA. A neutral data warehouse is configured to store the log. A reporting module generates one or more reports for a party indicated by the ILA from the log in the neutral data warehouse in accordance with the ILA.

16 Claims, 4 Drawing Sheets

CERTIFIED IT SERVICES IN-A-BOX

TECHNICAL FIELD

The present disclosure relates to a system and method for certified IT services in-a-box.

BACKGROUND

Traditionally, in cloud computing environments a cloud computing provider ("provider") sells a service to consumers and controls the hardware and software that supports the service. Often, in cloud computing environments, the consumer lacks control of the underlying service infrastructure and the infrastructure specifics, such as geographical location of hardware and data, are hidden from the consumer. Consumers in some industries may operate under business constraints. These business constraints, among other things, may dictate where data is stored, where processing may occur, and who has access to the data. Because the business constraints may impose liabilities for violating them, the lack of consumer transparency and control of the cloud computing infrastructure may keep those consumers from utilizing cloud computing services.

To address consumer concerns about the cloud computing infrastructure, some providers may offer service level agreements, which may, for example, specify a tolerable percentage of service downtime. However, there is no general mechanism by which these agreements address the consumer's business constraint liabilities arising from provider failures.

SUMMARY

A system includes one or more cloud computing auditing components. The one or more auditing components configured to monitor a cloud computing environment ("CCE") in accordance with a predefined insurance level agreement ("ILA"). The one or more auditing components further configured to create a log of one or more CCE events indicated by the ILA. A neutral data warehouse is used to store the log. A reporting module is used to generate one or more reports for a party indicated by the ILA from the log in the neutral data warehouse. The one or more reports are generated in accordance with the ILA.

A method includes configuring one or more cloud computing components to monitor a CCE in accordance with a predefined ILA. Creating a log of one or more CCE events using the one or more cloud computing auditing components. The one or more CCE events are indicated by the ILA. Storing the log in a neutral data warehouse. Generating one or more reports for a party indicated by the ILA from the log in the neutral data warehouse. The one or more reports are generated in accordance with the ILA. A machine-readable medium storing instructions that, when executed by a processor, perform this method.

DETAILED DESCRIPTION

Figure 1:
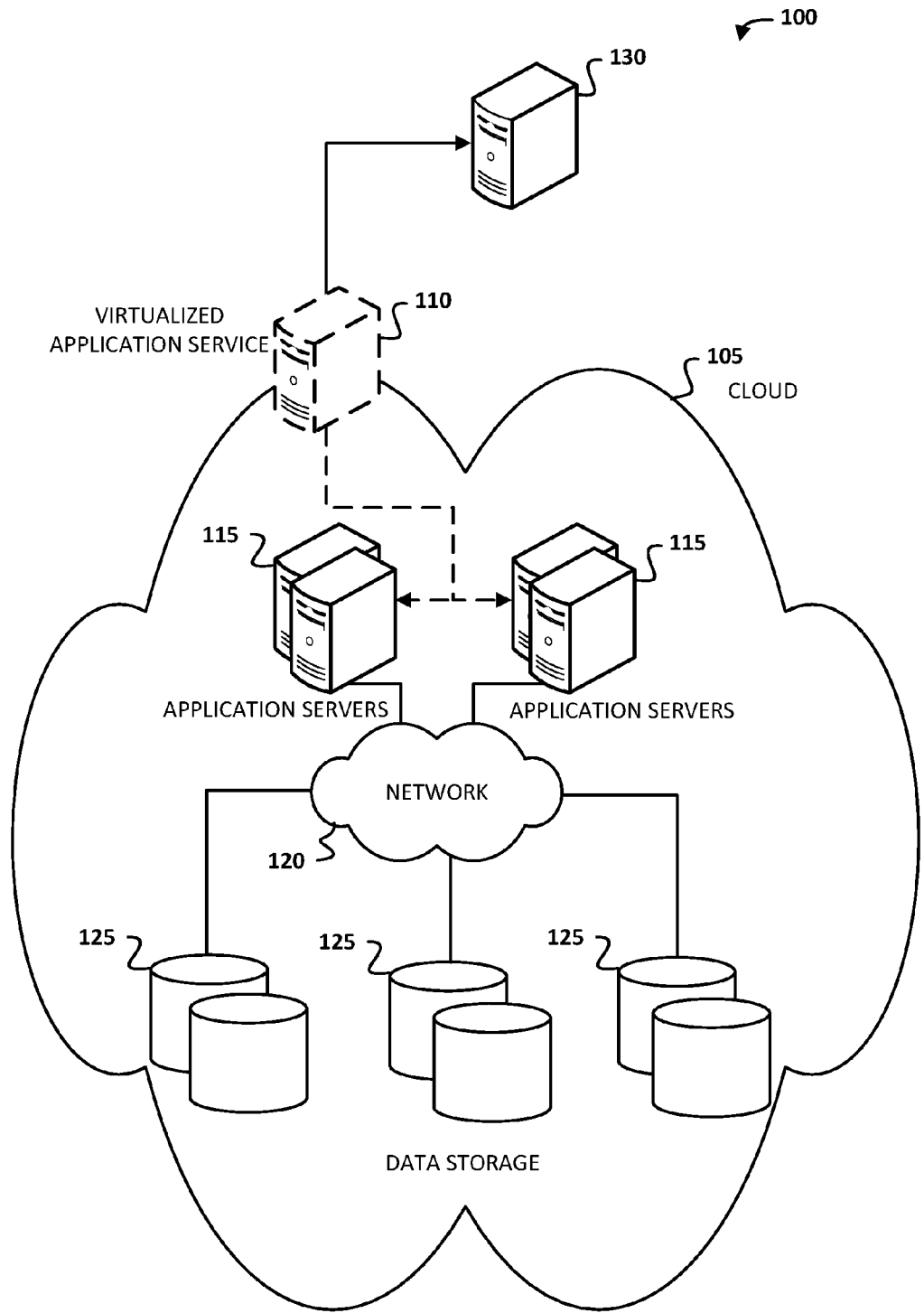
FIG. 1 is a block diagram illustrating an example cloud computing environment.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. Furthermore, a particular feature, structure, or characteristic described herein in connection with one embodiment may be implemented within other embodiments without departing from the scope of the invention. In addition, it is to be understood that the location or arrangement of individual elements within each disclosed embodiment may be modified without departing from the scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

A number of figures show block diagrams of systems and apparatus of embodiments of the invention. A figure shows a flow diagram illustrating operations of systems and apparatus for such embodiments. The operations of the flow diagram will be described with references to the systems/apparatuses shown in the block diagrams. However, it should be understood that the operations of the flow diagrams could be performed by embodiments of systems and apparatus other than those discussed with reference to the block diagrams, and embodiments discussed with reference to the systems/apparatus could perform operations different than those discussed with reference to the flow diagrams.

FIG. 1 is a block diagram illustrating an example cloud computing environment ("CCE") 100. In some embodiments the CCE 100 includes a cloud 105 and one or more consumer machines 130. In some embodiments the cloud 105 further includes one or more virtualized application services 110 and one or more application servers 115 connected via a network 120 to, possibly, distributed data storage 125.

An example cloud computing service is information storage. In this example, a consumer, through the consumer machine 130, typically stores some of its data in the cloud 105. Usually, the consumer machine 130 interfaces with the cloud 105 through the virtualized application service 110. The virtualized application service 110 provides the consumer machine 130 with the necessary storage interfaces while obfuscating the underlying infrastructure to allow the provider to manage that infrastructure for high-availability, speed, or other factors to efficiently provide the requested service.

The infrastructure may consist of multiple application servers 115 which may ultimately provide the cloud computing service. These application servers 115 may reside in multiple locations to help ensure availability in the case of a service disrupting event at one of the locations. Parts of the data storage 125 may also reside in multiple locations to mitigate the effects of an event at one of the locations. The application servers 115 may be connected with each other and the data storage 125 via one or more networks 120. The consumer data accepted by the provider may be processed by any of the applications servers 115 in any of the locations that those applications servers 115 reside, and may be stored in any part of the data storage 125 at any location that the part of the data storage 125 resides.

Typically CCEs 100 have many application servers 115 and large amounts of data storage 125. These resources often allow the provider to mitigate the effects of data center events, provide consumers with additional resources during peak processing times, and other advantages which provide economic advantages over more localized solutions. Accordingly, cloud computing services are often an attractive alternative to consumer ownership and management of the service within its organization.

Infrastructure implementation details of a cloud computing service are typically hidden from the consumer behind, for example, the virtualized application service 110. Some consumers who would like to take advantage of cloud computing service benefits also operate under business constraints due, for example, to government or industry regulation, that restrict, among other things, where data may be processed or stored. These consumers will typically incur fiscal liabilities when the business constraints are violated through, for example, regulatory fines. As such, the consumer may not take advantage of the cloud computing service because the consumer can not control the underlying infrastructure and potential corresponding liability. Although the consumer could enter into an agreement with a provider to manage its data and processing in accordance with its business constraints, consumer trust may still be lacking due to the continued lack of transparency of the cloud computing service infrastructure details.

Consumer trust may be established by specifying financial remedies for provider violations of the agreement supported by an insurance policy. In some embodiments the agreement may be known as an insurance level agreement ("ILA"). The ILA may define the service agreement at issue, e.g., that data must be stored in the U.S., and the parties to the agreement, e.g., the provider, consumer, and insurer, as well as the level of insurance coverage. In some embodiments the ILA may further provide instructions for determining the occurrence of an insurable event, and the processes by which fault for the event is ascertained.

One or more embodiments described herein provide infrastructure to support ILAs through configuring one or more cloud computing auditing components to monitor the CCE 100 in accordance with a predefined ILA. The cloud computing monitoring components keep a log of one or more CCE 100 events, such as data movement, indicated by the ILA. The log is then stored in a neutral data warehouse where it may provide forensic data to a party to the ILA when a violation of the ILA has occurred and the insurance policy is invoked. In some embodiments the infrastructure may be a package, or an IT service in-a-box, that may also be certified by the insurer.

Figure 2:
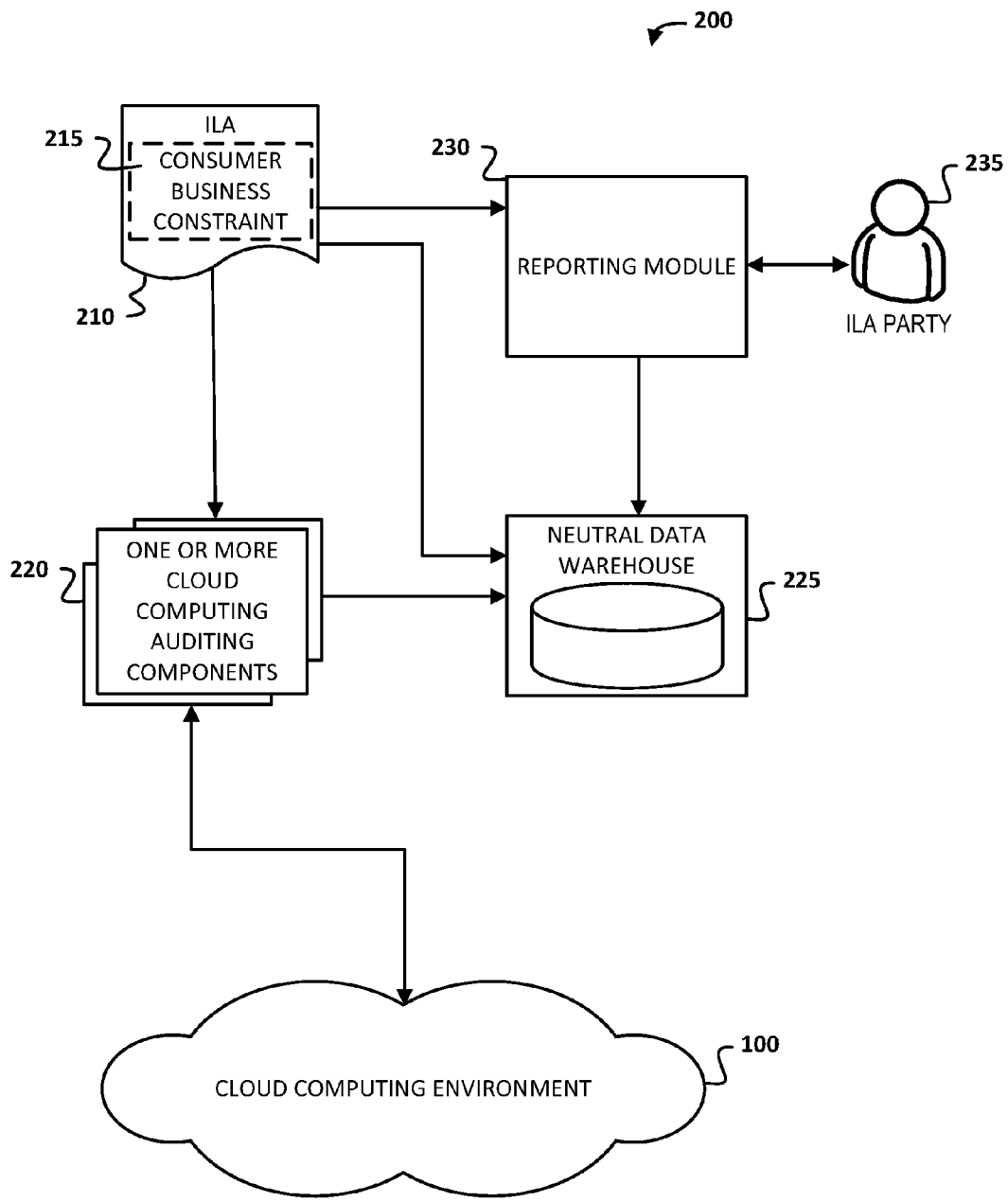
FIG. 2 is a block diagram illustrating an example embodiment of a system to provide certified IT services in-a-box.

FIG. 2 is a block diagram illustrating an example embodiment of a system 200 to provide certified IT services in-a-box. The system 200 includes an ILA 210, one or more cloud computing auditing components 220, a neutral data warehouse 225, and a reporting module 230. In some embodiments the ILA 210 includes one or more consumer business constraints 215. In some embodiments the business constraints 215 may be one or more of a restriction on access to data, data retention, geographical location of services, or geographical location of data. The ILA 210 may be available to one or more of the one or more cloud computing auditing components 220, the neutral data warehouse 225, and the reporting module 230. In some embodiments the one or more cloud computing auditing components 220, the neutral data warehouse 225, and the reporting module 230, are combined in a package known as an IT service in-a-box.

The one or more cloud computing auditing components 220 may be coupled to the CCE 100. The one or more cloud computing auditing components 220 may be coupled such that they can monitor CCE 100 events in accordance with the ILA 210. For example, if the cloud computing service is storage and the consumer business constraint 215 defined in the ILA 210 requires the consumer data to be stored in the U.S., then the one or more cloud computing auditing components 220 may be able to monitor when and where the consumer data is moved within the CCE 100. The one or more cloud computing auditing components 220 may then create a log of the pertinent events and transfer them to the neutral data warehouse 225. In some embodiments the transfer may be continuous, as the events occur. In other embodiments the transfer may occur at scheduled times.

The neutral data warehouse 225 may accept the logs generated by the one or more cloud computing auditing components 220. In some embodiments the neutral data warehouse 225 uses the ILA 210 to determine what parties have access to the data. In some embodiments the neutral data warehouse 225 will ensure that the received data is retained for a period of time and only altered in accordance with the ILA 210. In some embodiments the neutral data warehouse 225 may reside within the CCE 100. In other embodiments the neutral data warehouse 225 may reside outside of the CCE 100.

The reporting module 230 may be coupled to any entity specified in the ILA 210, known as an ILA party 235. The reporting module 230 may also be coupled to the neutral data warehouse 225 to provide reports to an ILA party 235.

Figure 3:
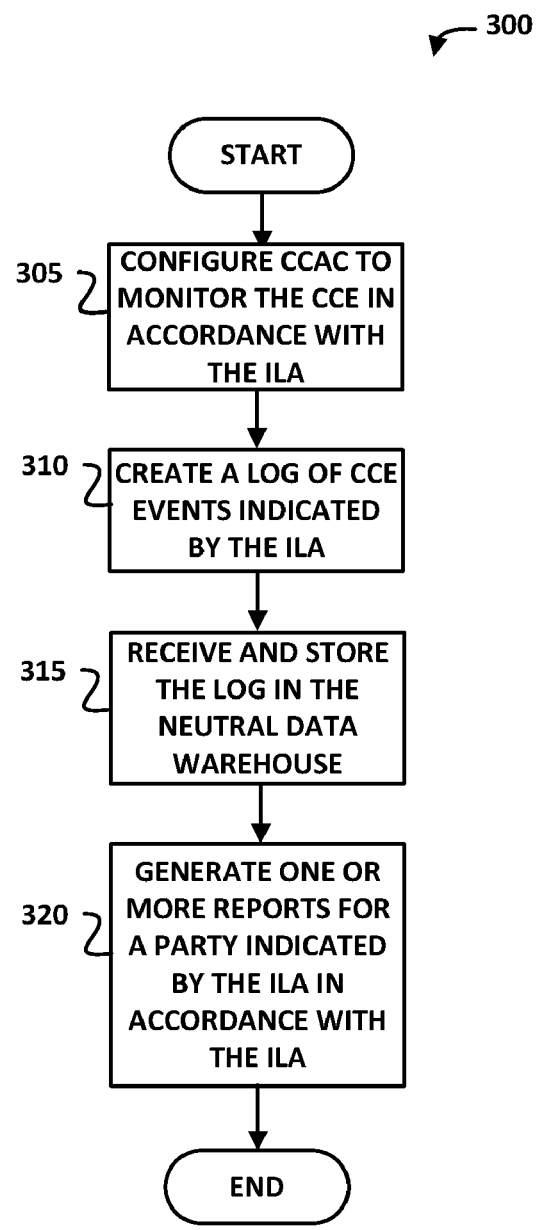
FIG. 3 is a flowchart illustrating an example embodiment of a method to provide certified IT services in-a-box.

FIG. 3 is a flowchart illustrating an example embodiment of a method 300 to provide certified IT services in-a-box.

At 305 the one or more cloud computing auditing components ("CCAC") 220 may be configured to monitor the CCE 100 in accordance with the ILA 210. In some embodiments the CCAC 220 may integrate with existing systems in the CCE 100 to perform the CCE 100 monitoring directly. In other embodiments the CCAC 220 may receive monitoring information from CCE 100 systems.

At 310 the CCAC 220 may create a log of CCE 100 events indicated by the ILA 210. Examples of ILA 210 events could include moving data, processing data, and accessing data. For example, if a consumer was a U.S. health care provider and was storing patient data in the CCE 100, the ILA 210 may include a business constraint 215 on who may access the patient data in compliance with the Health Insurance Portability and Accountability Act of 1996 ("HIPAA"). The CCAC 220 may then log only data accesses to the patient data. Other examples include processing certain transactions that must not occur in a particular jurisdiction due to local laws, in which case the relevant event may be the processing of those transactions. In some embodiments the ILA 210 may indicate many different events that should be logged. Because logging data may be expensive in terms of both processing and storage resources, it is advantageous to log only those events indicated by the ILA 210, because further logging provides no benefit to the ILA parties 235.

At 315 the neutral data warehouse 225 receives and stores the log from the CCAC 220. In some embodiments the neutral data warehouse 225 may enforce data retention and access policies specified by the ILA 210 to support forensic analysis used to determine fault if there is an insurable event under the ILA 210. For example, the ILA 210 may specify a log retention time at least as long after an event as a claim may be brought for that event, and the neutral data warehouse 225 may prevent a log from being destroyed before this date. In another example, the ILA 210 may specify that the logs may not be modified by any but a government agency, and the neutral data warehouse 225 may prevent another party from modifying the logs using suitable data access controls that selectively grant permissions. In some embodiments the logs may be removed from the neutral data warehouse 225 and archived at another location.

At 320 the reporting module 230 generates one or more reports for an ILA party 235. In some embodiments the reporting module 230 periodically generates reports for an ILA party 235. In some embodiments an ILA party 235 may request a report at any time. In some embodiments the reports are generated in response to an insurable event, such as a claim by the consumer. In some embodiments the reports are provided on-line, over a network. In other embodiments the reports are provided offline, including on digital media and paper or other printed media.

Insurance level agreements allow consumers to take advantage of cloud computing services where they may not have previously been able to due to the business constraints under which they operate coupled with their inability to monitor the underlying cloud computing environment. Insurance level agreements further allow providers to differentiate their products to consumers who are not burdened with some of the business constraints outlined above. Monitoring the cloud computing environment in accordance with the insurance level agreement allows the parties to enforce the agreement and ensures that consumers receive the protection they seek. In addition, focusing event monitoring to the events specified in the insurance level agreement increases processing and data storage efficiency by reducing the monitoring of events that have no economic interest to the insurance level agreement parties.

Figure 4:
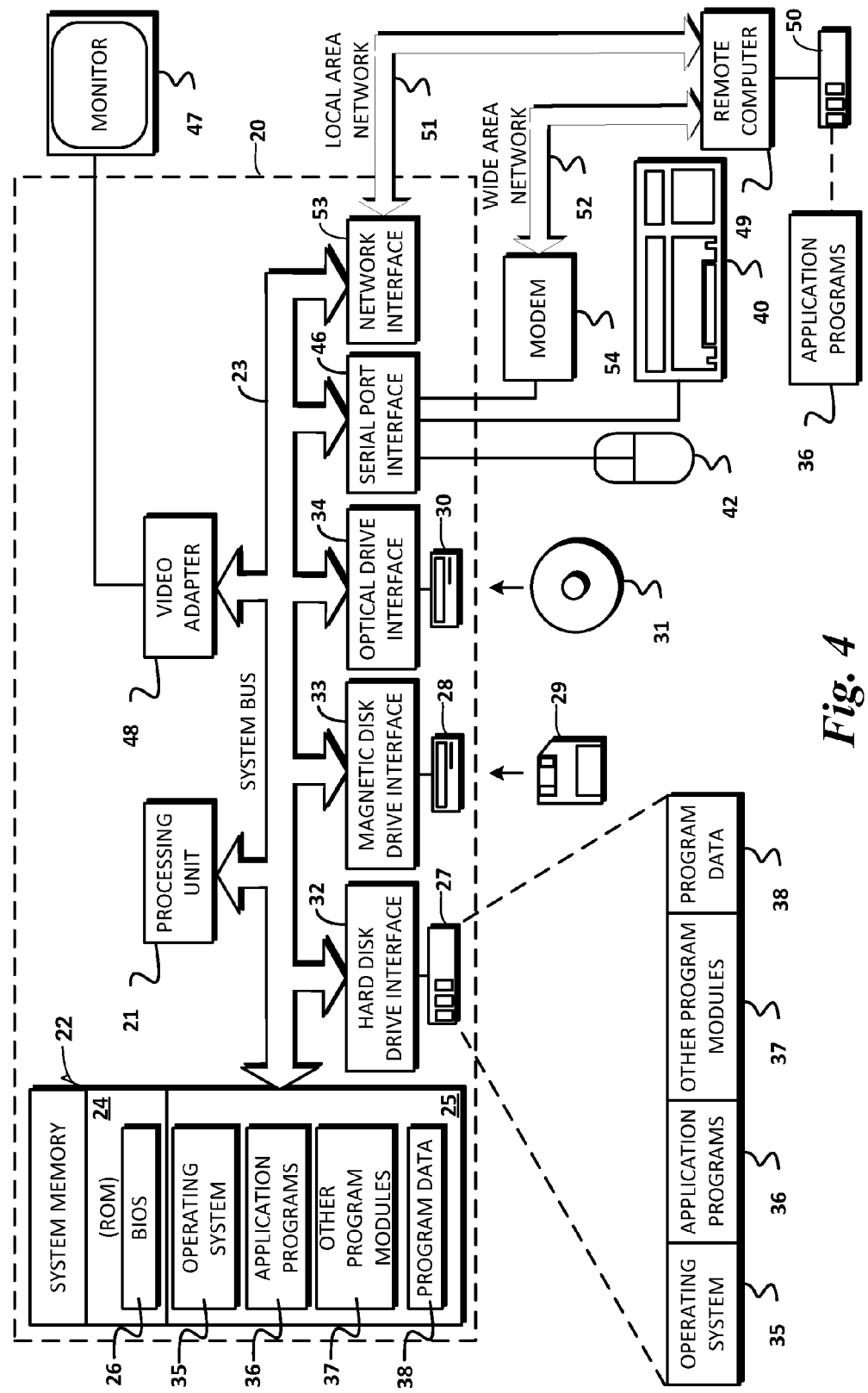
FIG. 4 is a block diagram illustrating an example embodiment of a computer system upon which one or more embodiments of the present disclosure can execute.

FIG. 4 is an overview diagram of hardware and operating environment in conjunction with which embodiments of the invention may be practiced. The description of FIG. 4 is intended to provide a brief, general description of suitable computer hardware and a suitable computing environment in conjunction with which the invention may be implemented. In some embodiments, the invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PCS, minicomputers, mainframe computers, and the like. The invention may also be practiced in distributed computer environments where tasks are performed by I/O remote processing devices that are linked through a communications network. In a distributed computing environment, program modules may be located in both local and remote memory storage devices.

In the embodiment shown in FIG. 4, a hardware and operating environment is provided that is applicable to any of the servers and/or remote clients shown in the other Figures.

As shown in FIG. 4, one embodiment of the hardware and operating environment includes a general purpose computing device in the form of a computer 20 (e.g., a personal computer, workstation, or server), including one or more processing units 21, a system memory 22, and a system bus 23 that operatively couples various system components including the system memory 22 to the processing unit 21. There may be only one or there may be more than one processing unit 21, such that the processor of computer 20 comprises a single central-processing unit (CPU), or a plurality of processing units, commonly referred to as a multiprocessor or parallel-processor environment. In various embodiments, computer 20 is a conventional computer, a distributed computer, or any other type of computer.

The system bus 23 can be any of several types of bus structures including a memory bus or memory controller, a peripheral bus, and a local bus using any of a variety of bus architectures. The system memory can also be referred to as simply the memory, and, in some embodiments, includes read-only memory (ROM) 24 and random-access memory (RAM) 25. A basic input/output system (BIOS) program 26, containing the basic routines that help to transfer information between elements within the computer 20, such as during start-up, may be stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 couple with a hard disk drive interface 32, a magnetic disk drive interface 33, and an optical disk drive interface 34, respectively. The drives and their associated computer-readable media provide non volatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), redundant arrays of independent disks (e.g., RAID storage devices) and the like, can be used in the exemplary operating environment.

A plurality of program modules can be stored on the hard disk, magnetic disk 29, optical disk 31, ROM 24, or RAM 25, including an operating system 35, one or more application programs 36, other program modules 37, and program data 38. A plug in containing a security transmission engine for the present invention can be resident on any one or number of these computer-readable media.

A user may enter commands and information into computer 20 through input devices such as a keyboard 40 and pointing device 42. Other input devices (not shown) can include a microphone, joystick, game pad, satellite dish, scanner, or the like. These other input devices are often connected to the processing unit 21 through a serial port interface 46 that is coupled to the system bus 23, but can be connected by other interfaces, such as a parallel port, game port, or a universal serial bus (USB). A monitor 47 or other type of display device can also be connected to the system bus 23 via an interface, such as a video adapter 48. The monitor 40 can display a graphical user interface for the user. In addition to the monitor 40, computers typically include other peripheral output devices (not shown), such as speakers and printers.

The computer 20 may operate in a networked environment using logical connections to one or more remote computers or servers, such as remote computer 49. These logical connections are achieved by a communication device coupled to or a part of the computer 20; the invention is not limited to a particular type of communications device. The remote computer 49 can be another computer, a server, a router, a network PC, a client, a peer device or other common network node, and typically includes many or all of the elements described above I/O relative to the computer 20, although only a memory storage device 50 has been illustrated. The logical connections depicted in FIG. 4 include a local area network (LAN) 51 and/or a wide area network (WAN) 52. Such networking environments are commonplace in office networks, enterprise-wide computer networks, intranets and the internet, which are all types of networks.

When used in a LAN-networking environment, the computer 20 is connected to the LAN 51 through a network interface or adapter 53, which is one type of communications device. In some embodiments, when used in a WAN-networking environment, the computer 20 typically includes a modem 54 (another type of communications device) or any other type of communications device, e.g., a wireless transceiver, for establishing communications over the wide-area network 52, such as the internet. The modem 54, which may be internal or external, is connected to the system bus 23 via the serial port interface 46. In a networked environment, program modules depicted relative to the computer 20 can be stored in the remote memory storage device 50 of remote computer, or server 49. It is appreciated that the network connections shown are exemplary and other means of, and communications devices for, establishing a communications link between the computers may be used including hybrid fiber-coax connections, T1-T3 lines, DSL's, OC-3 and/or OC-12, TCP/IP, microwave, wireless application protocol, and any other electronic media through any suitable switches, routers, outlets and power lines, as the same are known and understood by one of ordinary skill in the art.

Embodiments of the invention include features, methods or processes embodied within machine-executable instructions provided by a machine-readable medium. A machine-readable medium includes any mechanism which provides (i.e., stores) information in a form accessible by a machine (e.g., a computer, a network device, a personal digital assistant, manufacturing tool, any device with a set of one or more processors, etc.). In an exemplary embodiment, a machine-readable medium includes volatile and/or non-volatile media (e.g., read only memory (ROM), random access memory (RAM), magnetic disk storage media, optical storage media, flash memory devices, etc.), as well as electrical, optical, acoustical or other form of propagated signals (e.g., carrier waves, infrared signals, digital signals, etc.)). Consequently, a machine-readable medium can be either tangible or intangible in nature.

In one embodiment, the term "machine-readable medium" or "computer-readable medium" shall be taken to include any tangible non-transitory medium which is capable of storing or encoding a sequence of instructions for execution by the machine and that causes the machine to perform any one of the methodologies. In a second embodiment separate from the first embodiment, the term "machine-readable medium" or "computer-readable medium" shall be taken to include any intangible transitory medium which is capable of storing or encoding a sequence of instructions for execution by the machine and that causes the machine to perform any one of the methodologies. Consequently, a machine-readable medium can be either tangible or intangible in nature.

Such instructions are utilized to cause a general or special purpose processor, programmed with the instructions, to perform methods or processes of the embodiments of the invention. Alternatively, the features or operations of embodiments of the invention may be performed by specific hardware components which contain hard-wired logic for performing the operations, or by any combination of programmed data processing components and specific hardware components. Embodiments of the invention include digital/analog signal processing systems, software, data processing hardware, data processing system-implemented methods, and various processing operations, further described herein.

Thus, an example system, method and machine readable medium for certified IT services in-a-box have been described. Although specific example embodiments have been described, it will be evident that various modifications and changes may be made to these embodiments without departing from the broader scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate example embodiment.

What is claimed is:
1. A method comprising:
   integrating one or more cloud computing auditing components with existing systems of a cloud computing environment (CCE);
   configuring the one or more cloud computing auditing components to directly monitor the CCE in accordance with a predefined insurance level agreement (ILA);
   creating a log of one or more CCE events using the one or more cloud computing auditing components, the one or more events indicated by the ILA;
   storing the log in a neutral data warehouse; and
   preventing, using the neutral data warehouse, manipulation of the log in accordance with the ILA, wherein the one or more auditing components and the neutral data warehouse are a package certified by an insurer that is party to the ILA.

2. The method of claim 1, wherein the ILA includes a service obligation from a CCE provider to a CCE consumer and a financial compensation to the CCE consumer for a violation of the service obligation.

3. The method of claim 2, wherein the service obligation represents a business constraint on the CCE consumer.

4. The method of claim 3, wherein the business constraint is at least one of an access restriction to data, data retention, geographical location of services, and geographical location of data.

5. The method of claim 1, wherein the neutral data warehouse is configured to retain the log for a period of time specified in the ILA.

6. The method of claim 5, wherein the period of time is at least as long as an interval following an event in which an insurance claim may be brought for that event.

7. The method of claim 1, wherein the neutral data warehouse is external to the CCE.

8. A system comprising:
a data processor;
one or more cloud computing auditing components, the one or more cloud computing auditing components configured to:
integrate with existing systems of a cloud computing environment (CCE);
monitor the CCE in accordance with a predefined insurance level agreement (ILA); and
create a log of one or more CCE events indicated by the ILA; and a neutral data warehouse configured to:
store the log; and
prevent manipulation of the log in accordance with the ILA, wherein the one or more auditing components and the neutral data warehouse are a package certified by an insurer that is party to the ILA.

9. The system of claim 8, wherein the ILA includes a service obligation from a CCE provider to a CCE consumer and a financial compensation to the CCE consumer for a violation of the service obligation.

10. The system of claim 9, wherein the service obligation represents a business constraint on the CCE consumer.

11. The system of claim 10, wherein the business constraint is at least one of an access restriction to data, data retention, geographical location of services, and geographical location of data.

12. The system of claim 8, wherein the neutral data warehouse is further configured to retain the log for a period of time specified in the ILA.

13. The system of claim 12, wherein the period of time is at least as long as an interval following an event in which an insurance claim may be brought for that event.

14. The system of claim 8, wherein the neutral data warehouse is external to the CCE.

15. A machine-readable medium storing instructions that, when executed by at least one processor, cause the at least one processor to perform the following actions:
integrating one or more cloud computing auditing components with existing systems of a cloud computing environment (CCE);
configuring the one or more cloud computing auditing components to monitor the CCE in accordance with an insurance level agreement (ILA);
creating a log of one or more CCE events using the one or more cloud computing auditing components, the one or more events indicated by the ILA;
receiving and storing the log in a neutral data warehouse; and
preventing, using the neutral data warehouse, manipulation of the log in accordance with the ILA, wherein the one or more auditing components and the neutral data warehouse are a package certified by an insurer that is party to the ILA.

16. The machine-readable medium of claim 15, wherein the ILA includes a service obligation from a CCE provider to a CCE consumer and a financial compensation to the CCE consumer for a violation of the service obligation.

* * * * *